(12) United States Patent  
Sawada et al.

(10) Patent No.: US 9,241,301 B2  
(45) Date of Patent: Jan. 19, 2016

(54) WIRELESS COMMUNICATION SYSTEM, WIRELESS COMMUNICATION METHOD, MOBILE STATION DEVICE, AND BASE STATION DEVICE

(71) Applicant: Sharp Kabushiki Kaisha, Osaka-shi, Osaka (JP)

(72) Inventors: Shinichi Sawada, Osaka (JP); Katsutoshi Ishikura, Osaka (JP); Shigeto Suzuki, Osaka (JP); Yuhsuke Takagi, Osaka (JP); Shumpei Fuse, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/385,605

(22) PCT Filed: Apr. 9, 2013

(86) PCT No.: PCT/JP2013/060702  
§ 371 (c)(1),  
(2) Date: Sep. 16, 2014

(87) PCT Pub. No.: WO2013/154096  
PCT Pub. Date: Oct. 17, 2013

(65) Prior Publication Data  
US 2015/0050932 A1    Feb. 19, 2015

(30) Foreign Application Priority Data

Apr. 12, 2012 (JP) ................................. 2012-091158

(51) Int. Cl.  
*H04W 48/18* (2009.01)  
*H04W 48/16* (2009.01)  
(Continued)

(52) U.S. Cl.  
CPC .............. *H04W 48/16* (2013.01); *H04W 48/20* (2013.01); *H04W 76/02* (2013.01)

(58) Field of Classification Search  
CPC ..... H04W 48/16; H04W 48/18; H04W 48/20; H04W 88/06; H04W 48/12; H04W 72/02; H04W 76/02  
See application file for complete search history.

(56) References Cited

U.S. PATENT DOCUMENTS

2009/0296641 A1* 12/2009 Bienas et al. ................. 370/329  
2012/0178451 A1*  7/2012 Kubota et al. ................ 455/436  
(Continued)

FOREIGN PATENT DOCUMENTS

| EP | 2 512 170 A1 | 10/2012 |
|---|---|---|
| WO | 2011/069410 A1 | 6/2011 |
| WO | 2013/104416 A1 | 7/2013 |

OTHER PUBLICATIONS

3GPP TS 36.300 V11.0.0, "3rd Generation Partnership Project; Technical Specification Group Radio Access Network; Evolved Universal Terrestrial Radio Access (E-UTRA); and Evolved Universal Terrestrial Radio Access Network (E-UTAN); Overall Description; Stage 2 (Release 11)," Dec. 2011, pp. 1-194.

(Continued)

Primary Examiner — Ted Wang  
(74) Attorney, Agent, or Firm — Keating & Bennett, LLP

(57) ABSTRACT

A wireless communication system includes a first base station device, a second base station device, and a mobile station device configured to communicate with the first and second base station devices. The first base station device includes a request notifying unit configured to notify the mobile station device of a request for carrier aggregation. The mobile station device includes: a cell search unit configured to, upon receiving the request, perform cell search and thereby search the second base station device available for carrier aggregation; and a base station notifying unit configured to notify the first base station device of information indicating the second base station device detected by the cell search unit performing the cell search.

8 Claims, 13 Drawing Sheets

(51) Int. Cl.
*H04W 48/20* (2009.01)
*H04W 76/02* (2009.01)

(56) References Cited

U.S. PATENT DOCUMENTS

2012/0252435 A1* 10/2012 Bienas ............... H04W 24/02
455/422.1

2015/0038138 A1* 2/2015 Nylander .............. H04W 24/02
455/434

OTHER PUBLICATIONS

LG Electronics 3GPP TSG RAN WG1 Meeting #57 R1-092128, "Initial Access Procedure in LTE-Advanced," May 4-8, 2009, 5 pages.
Nokia Siemens Networks, "Carrier Based ICIC for Inter-eNB PCell/SCell Optimization", 3GPP TSG-RAN WG3, Meeting #75-Bis, R3-120602, Mar. 26-30, 2012, 4 pages.

* cited by examiner

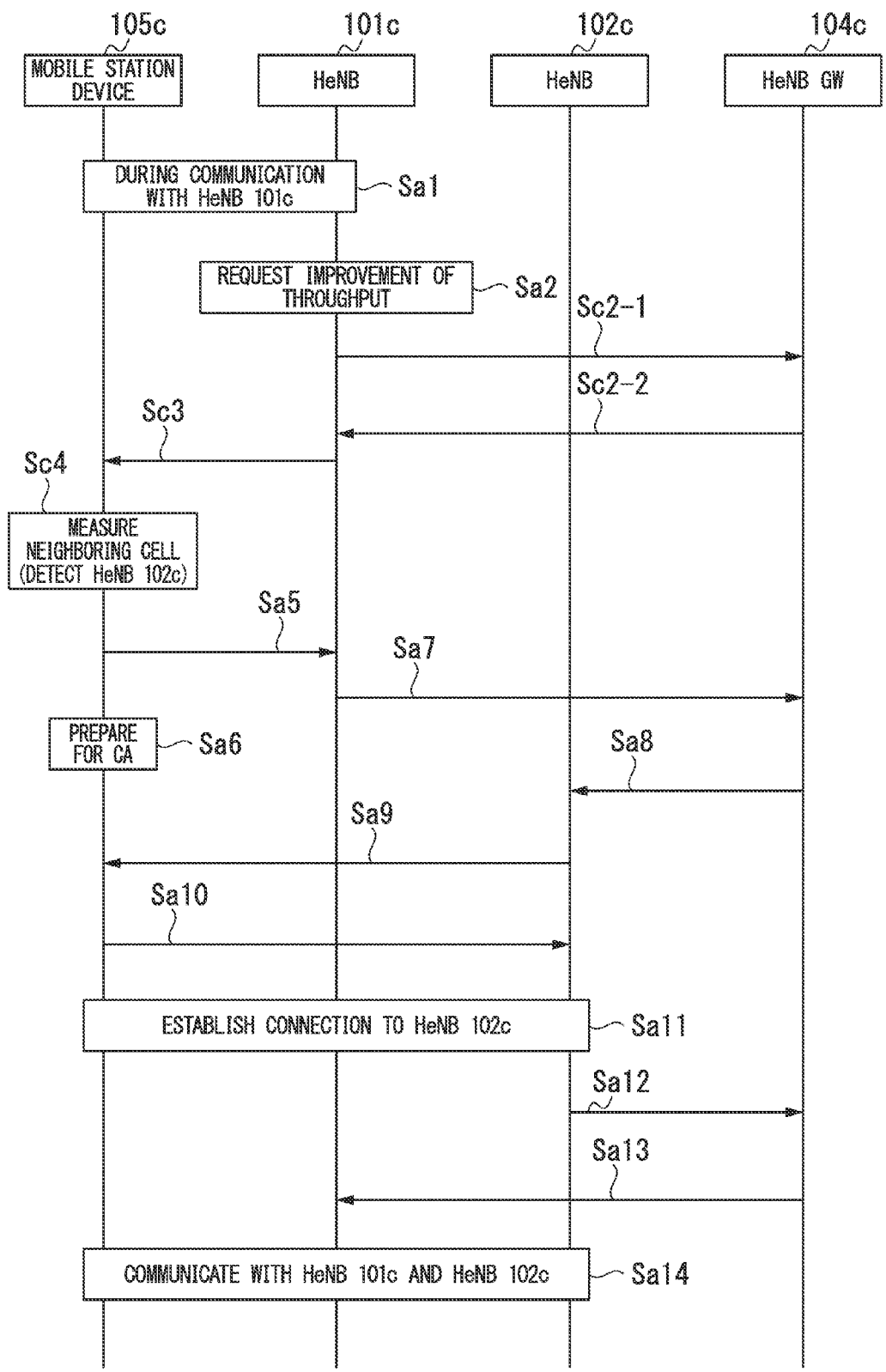

WIRELESS COMMUNICATION SYSTEM, WIRELESS COMMUNICATION METHOD, MOBILE STATION DEVICE, AND BASE STATION DEVICE

TECHNICAL FIELD

The present invention relates to a wireless communication system, wireless communication method, a mobile station device, and a base station device.

Priority is claimed on Japanese Patent Application No. 2012-091158, filed Apr. 12, 2012, the content of which is incorporated herein by reference.

BACKGROUND ART

Currently, specifications of LTE-A (long term evolution-advanced) are considered by 3GPP (3rd Generation Partnership Project). Implementation of higher-speed LTE-A communication than LTE communication has been requested. For this reason, it has been decided that the LTE-A supports a wider band than used in LTE (beyond the LTE bandwidth of 20 MHz, up to the bandwidth of 100 MHz).

In LTE-A, for the purpose of maintaining the compatibility with LTE as much as possible, carrier aggregation (CA) technology is used. The carrier aggregation technology is a technology that uses a plurality of frequency bandwidths, each of which is up to 20 MHz and is called a component carrier (CC), performs collective communication, thus saving the bandwidth by up to 100 MHz and thereby implementing high speed communication with large capacity (see unit 5.5 of Non-Patent Document 1).

There are three CA methods based on the use of the frequency band to be used.

(1) Same contiguous frequency bands are used (Intra-band Contiguous CA).

(2) Same dispersed frequency bands are used (Intra-band Non-Contiguous CA).

(3) Different frequency bands are used (Inter-band Non-Contiguous CA).

The conventionally considered CA technology is CA technology among mobile stations and one macrocell base station, which has the feature that PUCCH (physical uplink control channel) is transmitted from the mobile station using only one CC. There are the following two reasons that it has been agreed that PUCCH be transmitted using one CC.

If PUCCH is transmitted using a plurality of CCs, PAPR and current consumption increase, and therefore the load on a battery of the mobile station device increases. For this reason, the PUCCH is transmitted using only one CC.

When the same contiguous frequency bands are used (the above (1)), the bands used for transmission of PUCCHs overlap one another, thus occasionally causing generation of spurious signals. For this reason, the PUCCH is transmitted using any one of the CCs.

A CC used to transmit PUCCH is defined as a PCC (primary component carrier), and a CC not used to transmit PUCCH is defined as an SCC (secondary component carrier). Additionally, it has been agreed that an SCC is not used to transmit PRACH. In other words, the CA communication described here means a communication method in which a plurality of frequency bands are used to perform transmission and reception, but PUCCH is transmitted using only one CC.

Further, in the conventional multicarrier communication, in a case where a new frequency band is added, PRACH (physical random access channel) is transmitted using that frequency band to be added, synchronization is established, a connection process is performed, and thus the frequency band is added. PRACH signals also have been able to be used independently in any frequency bands.

The CA communication uses a different connection process from that used for the multi-carrier communication, and it is limited to a PCC, a first frequency band, that can use PRACH signals (see Section 7.5 of Non-Patent Document 1).

CITATION LIST

Non-Patent Document

[Non-Patent Document 1] 3GPP TS 36.300 V11.0.0 (2011-12)

DISCLOSURE OF THE INVENTION

Problems to be Solved by the Invention

However, in the carrier aggregation described above, component carriers that can be aggregated are limited to those to be transmitted or received by one base station device, thereby causing a problem that a sufficient transmission rate cannot be achieved.

The present invention has been made in view of such circumstances and provides a wireless communication system, a wireless communication method, a mobile station device, and a base station device, which can achieve an excellent transmission rate.

Means for Solving the Problems (1) The present invention has been made to solve the above problems. A first aspect of the present invention is a wireless communication system including a first base station device, a second base station device, and a mobile station device configured to communicate with the first and second base station devices. The first base station device includes a request notifying unit configured to notify the mobile station device of a request for carrier aggregation. The mobile station device includes: a cell search unit configured to, upon receiving the request, perform cell search and thereby search the second base station device available for carrier aggregation; and a base station notifying unit configured to notify the first base station device of information indicating the second base station device detected by the cell search unit performing the cell search.

(2) Additionally, a second aspect of the present invention is the wireless communication system described in the above first aspect. The request notifying unit is configured to notify the mobile station device of information specifying a base station device targeted for the cell search, along with the request for carrier aggregation. The cell search unit is configured to perform the cell search in accordance with the notified information specifying the base station device.

(3) Further, a third aspect of the present invention is the wireless communication system described in the above first or second aspect. The first base station device includes a carrier aggregation connection instructing unit configured to instruct the second base station device indicated by the information notified by the base station notifying unit, to establish connection with the mobile station device targeted for carrier aggregation. The second base station device includes a carrier aggregation connection requesting unit configured to, based on the instruction to establish connection with the mobile station device, notify the mobile station device of a connection request for performing carrier aggregation.

(4) Moreover, a fourth aspect of the present invention is the wireless communication system described in the above first or second aspect. The first base station device includes: a carrier aggregation notifying unit configured to notify the second base station device indicated by the information notified by the base station notifying unit, of carrier aggregation with the mobile station device; and a carrier aggregation connection requesting unit configured to notify the mobile station device of a connection request for performing carrier aggregation, the connection request being a request for establishing connection with the second base station device indicated by the information notified by the base station notifying unit.

(5) Additionally, a fifth aspect of the present invention is the wireless communication system described in the above fourth aspect. The second base station device includes a carrier aggregation processing unit configured to, upon receiving a notification from the carrier aggregation notifying unit, prepare for carrier aggregation, and when the preparation is complete, notify the first base station device of a response to the notification. The carrier aggregation connection requesting unit is configured to notify the mobile station device of the connection request after receiving the response from the carrier aggregation processing unit.

(6) Further, a sixth aspect of the present invention is the wireless communication system described in any one of the above first to fifth aspects. The wireless communication system includes a base station gateway. The base station gateway includes: a relaying unit configured to relay communication between the first and second base station devices; and a base station synchronizing unit configured to synchronize transmission to the mobile station device performed by the first and second base station devices.

(7) Moreover, a seventh aspect of the present invention is a wireless communication method for a wireless communication system including a first base station device, a second base station device, and a mobile station device configured to communicate with the first and second base station devices. The wireless communication method includes: a first step for the first base station device to notify the mobile station device of a request for carrier aggregation; a second step for the mobile station device to, upon receiving the request, perform cell search and thereby search the second base station device available for carrier aggregation; and a third step for the mobile station device to notify the first base station device of information indicating the second base station device detected by the cell search unit performing the cell search.

(8) Additionally, an eighth aspect of the present invention is a base station device including a request notifying unit configured to notify a mobile station device of a request for carrier aggregation, which requests the mobile station device to perform cell search based on the request.

(9) Further, a ninth aspect of the present invention is a mobile station device including: a cell search unit configured to, upon receiving a request for carrier aggregation from a first base station device, perform cell search and thereby search a second base station device available for carrier aggregation; and a base station notifying unit configured to notify the first base station device of information indicating the second base station device detected by the cell search unit performing the cell search.

Effects of the Invention

According to the wireless communication system, the wireless communication method, the mobile station device, and the base station device of the present invention, it is possible to achieve an excellent transmission speed.

BRIEF DESCRIPTION OF THE DRAWINGS

FIG. 17 is a sequence chart illustrating operation of a wireless communication system according to the third embodiment.

BEST MODE FOR CARRYING OUT THE INVENTION

Embodiment 1

Hereinafter, a first embodiment of the present invention will be described with reference to the drawings.

Figure 1:
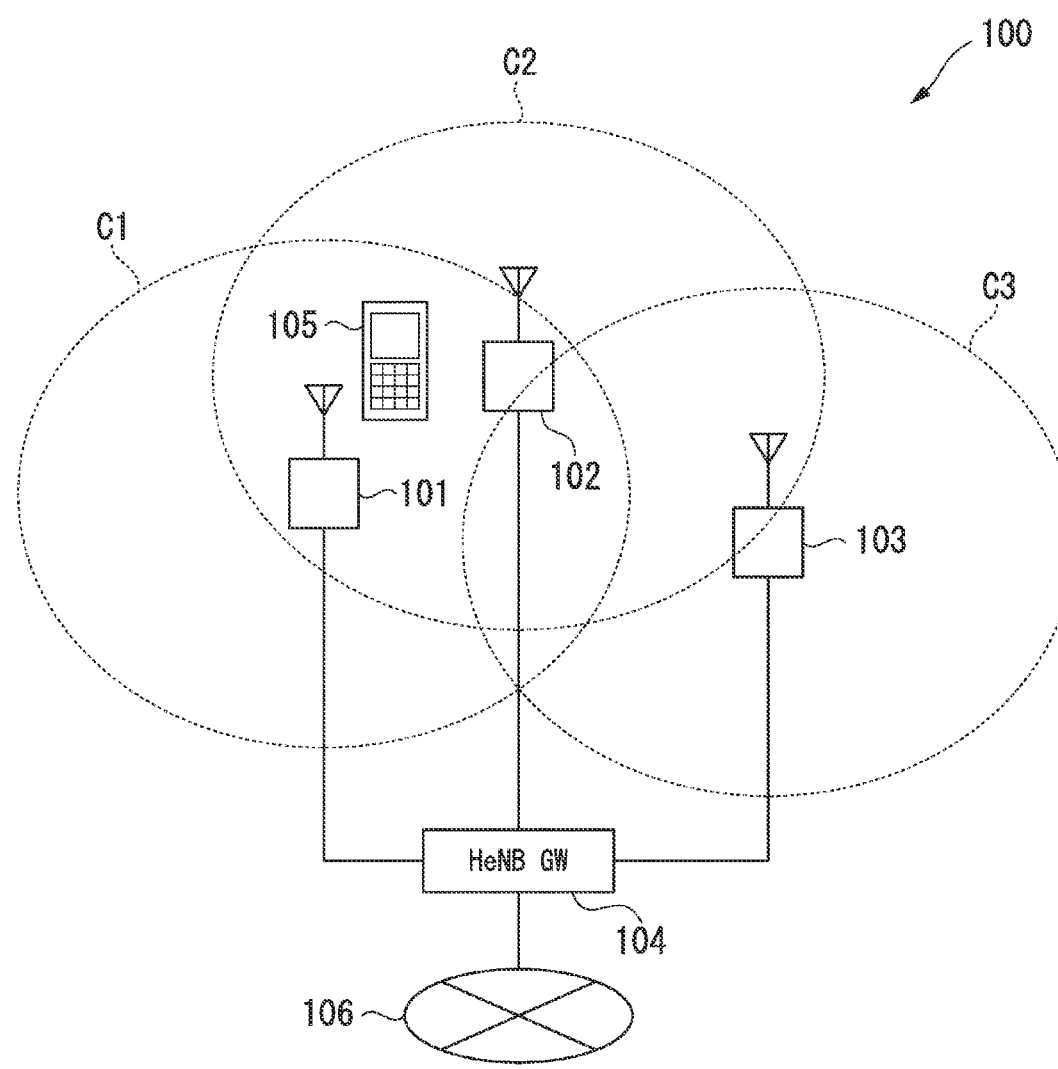
FIG. 1 is a schematic block diagram illustrating a configuration of a wireless communication system according to a first embodiment of the present invention.

FIG. 1 is a schematic block diagram illustrating a configuration of a wireless communication system 100 according to the first embodiment of the present invention. The wireless communication system 100 includes a HeNB (also referred to as a Home eNode B, a home base station device, a low-power base station, or a femtocell base station) 101, a HeNB 102, a HeNB 103, a HeNB GW, (HeNB Gateway; home base station gateway) 104, and a mobile station device 105. The HeNB 101 (first base station device), the HeNB 102 (second base station device), and the HeNB 103 are base station devices respectively serving cells C1, C2, and C3, as communication coverage. The cells C1, C2, and C3 partially overlap one another. The HeNBs 101, 102, and 103 respectively use three single frequency bands to communicate with the mobile station device 105. Each of the frequency bands is referred to as a component carrier having the bandwidth of up to 20 MHz. Additionally, the frequencies to be used by the HeNBs 101, 102, and 103 are different from one another. Here, each of the HeNBs 101, 102 and 103 may use different frequencies for uplink and downlink.

The HeNB GW 104 (the base station gateway) is accessibly connected to each of the HeNBs 101, 102, and 103 via the IP (Internet Protocol) network. In order to standardize transmission and reception timing control during CA communication among the mobile station device 105 and the HeNBs 101, 102, and 103, the HeNB GW104 synchronizes, in units of frames, the timings of operations performed by the HeNBs 101, 102, and 103 (transmission of signals addressed to the mobile station device).

Additionally, the HeNB GW 104 relays control signals transmitted among the HeNBs 101, 102 and 103. Further, the HeNB GW 104 is connected to the core network 106, and transmits via either one of the HeNBs 101, 102 and 103, data addressed to the mobile station device 105 which is received from the core network 106.

The mobile station device 105 wirelessly communicates with the HeNBs 101, 102, and 103. Here, the mobile station device 105 performs carrier aggregation to simultaneously communicate with a plurality of HeNBs, such as the HeNBs 101 and 102. Hereinafter, descriptions are given assuming that the mobile station device 105 performs carrier aggregation while regarding the cells of the HeNBs 101 and 102 respectively as a PCC (primary component carrier) and an SCC (secondary component carrier). Additionally, in the following descriptions, the expression "mobile station device", which is occasionally used without a reference numeral, indicates that the "mobile station device" is not limited to the mobile station device 105, but also includes other mobile station devices. Similarly, the expression "base station device" or "HeNB" without a reference numeral indicates that the "base station device" or "HeNB" is not limited to the HeNB 101 to 103, but also includes other base station devices or HeNBs.

Figure 2:
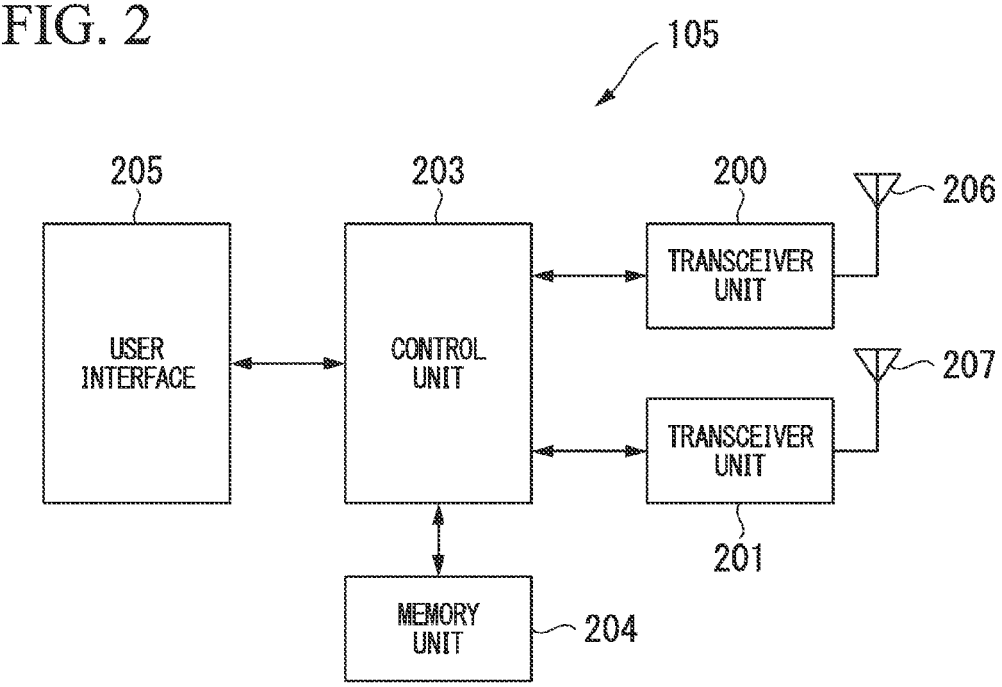
FIG. 2 is a schematic block diagram illustrating a configuration of a mobile station device according to the first embodiment.

FIG. 2 is a schematic block diagram illustrating a configuration of a mobile station device 105.

The mobile station device 105 includes two transceiver units 200 and 201, a control unit 203, a memory unit 204, a user interface 205, and two transceiver antennas 206 and 207.

The transceiver units 200 and 201 wirelessly communicate via the transceiver antennas 206 and 207 with the HeNBs 101, 102, and 103 using the frequency and bandwidth specified by the control unit 203. Here, in the present embodiment, when no carrier aggregation is performed, the transceiver unit 200 performs communication. Additionally, while the carrier aggregation is performed, the transceiver units 200 and 201 use different frequency bands to perform communication.

The control unit 203 reads and executes a program stored by the memory unit 204, thus controlling the entire mobile station device 105.

The memory unit 204 stores a program to be executed by the control unit 203 and data required for executing the program.

The user interface 205 is a device for presenting information to a user and inputting information from the user, such as a microphone, a speaker, a display, input keys, or a touch panel.

Figure 3:
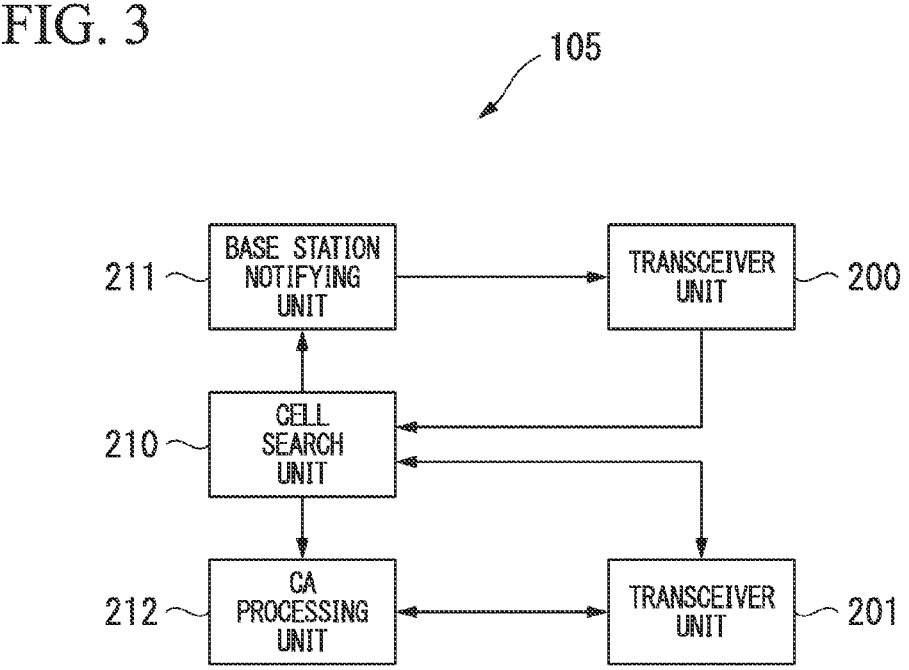
FIG. 3 is a schematic block diagram illustrating a configuration of part of logical functions of the mobile station device according to the first embodiment.

FIG. 3 is a schematic block diagram illustrating a configuration of part of logical functions of the mobile station device 105.

In FIG. 3, a cell search unit 210, a base station notifying unit 211, and a CA processing unit 212 are implemented by the control unit 203 reading and executing a program stored by the memory portion 204. When the transceiver unit 200 receives a carrier aggregation request (CA request) from a base station device (HeNB 101 in this case), the cell search unit 210 searches neighboring cells (cell search) by using the transceiver unit 201, and thus searches base station devices available for CA. Specifically, the cell search unit 210 sets to the transceiver unit 201, a reference frequency associated with any one of the base station devices. Then, the cell search unit 210 detects a synchronization signal transmitted by each base station device, from the signal received by the transceiver unit 201 at the reference frequency, and measures the reception power of the synchronization signal, thus performing a cell search. Here, whether or not carrier aggregation is available may be determined based on, for example, whether or not the reception power of the synchronization signal is larger than or equal to a predetermined threshold value. Alternatively, additional conditions may be further added to make the determination.

The cell search unit 210 determines a reference frequency to be set, based on, for example, neighboring cell information included in broadcast information transmitted by the HeNB 101. Here, since the purpose is to find a HeNB in order to perform the carrier aggregation, a base station device, which performs transmission and reception using the same frequency band as used by the HeNB (HeNB 101 in this case) currently in communication, may be excluded from targets of the cell search, even if that base station device is listed in the neighboring cell information. Alternatively, a macrocell may be excluded from the targets of the cell search.

The base station notifying unit 211 transmits via the transceiver unit 200, as a response to the CA request, information (base station information) indicating the base station device (HeNB 102 in this case) detected by the cell search unit 210 performing the cell search. Here, the information is transmitted to the HeNB 101 that is the base station device having transmitted the CA request. Here, when the cell search unit 210 cannot detect a base station device available for carrier aggregation, denial of carrier aggregation (NACK) is transmitted via the transceiver unit 200, as a response to the CA request.

The CA processing unit 212 prepares for carrier aggregation so as to communicate with the base station device detected by the cell search unit 210, as an SCC. Specifically, the CA processing unit 212 sets a reference frequency of the transceiver unit 201 so as to perform communication using the frequency band for the base station device (HeNB 102) detected by the cell search unit 210.

After the CA processing unit 212 sets the reference frequency of the transceiver unit 201, the CA processing unit 212 waits until the transceiver unit 201 receives a CA connection request (call connection request for CA connection) from the base station device (HeNB 102). Upon receiving the CA connection request, the CA processing unit 212 performs a CA connection process with the base station device having transmitted the CA connection request (HeNB 102).

Figure 4:
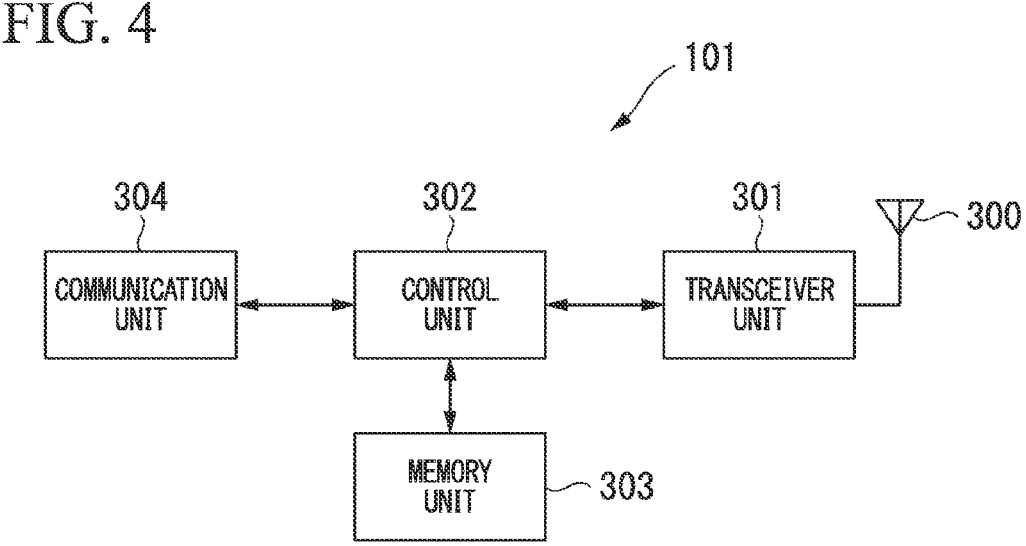
FIG. 4 is a schematic block diagram illustrating a configuration of a HeNB according to the first embodiment.

FIG. 4 is a schematic block diagram showing a configuration of the HeNB 101.

The HeNBs 102 and 103 have similar configurations to that of the HeNB 101 except that a frequency band used for transmission and reception to and from the mobile station is different, and therefore descriptions thereof are omitted here.

The HeNB 101 includes a transceiver antenna 300, a transceiver unit 301, a control unit 302, a memory unit 303, and a communication unit 304.

The transceiver unit 301 wirelessly communicates via the transceiver antenna 300 with the mobile station device 105, using a predetermined frequency band.

The control unit 302 reads and executes a program stored by the memory 303, thus controlling the entire HeNB 101.

The memory unit 303 stores a program to be executed by the control unit 302, and data required for executing the program.

The communication unit 304 communicates with the HeNB GW 104.

Figure 5:
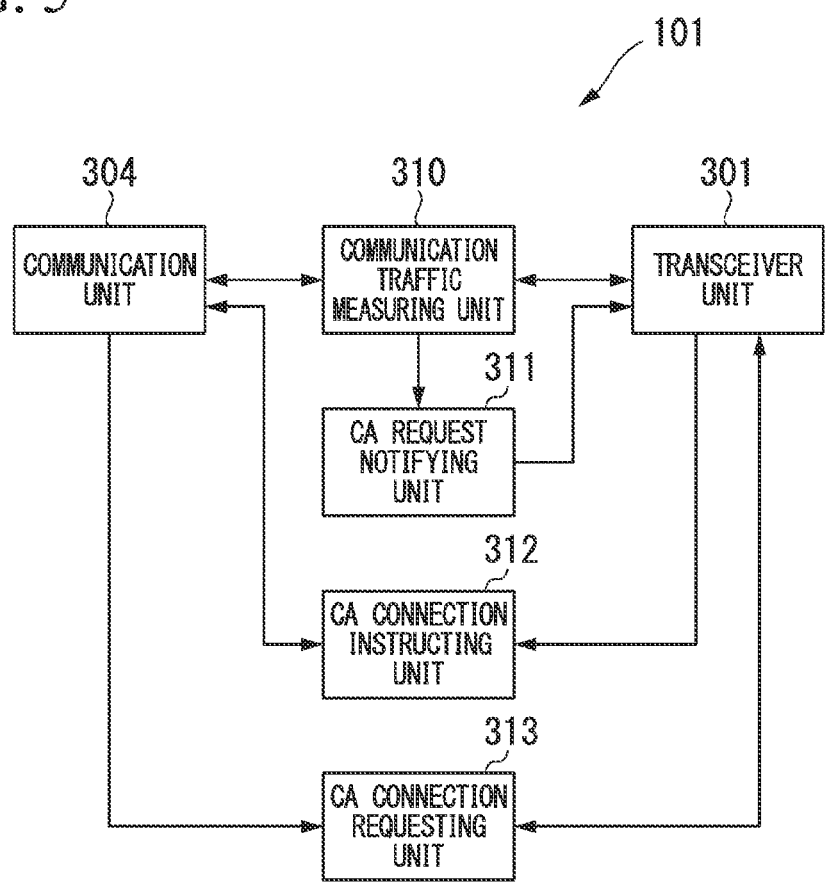
FIG. 5 is a schematic block diagram illustrating a configuration of part of logical functions of the HeNB according to the first embodiment.

FIG. 5 is a schematic block diagram illustrating a configuration of part of logical functions of the HeNB 101.

In FIG. 5, a communication traffic measuring unit 310, a CA connection request notifying unit 311, a CA connection instructing unit 312, and a CA connection requesting unit 313 are implemented by the control unit 302 reading and executing the program stored by the memory unit 303.

The communication traffic measuring unit 310 outputs to the transceiver unit 301, data addressed to each mobile station device, which is received by the communication unit 304 from the HeNB GW 104, so that the transceiver unit 301 transmits the data to each mobile station device.

At this time, the communication traffic measuring unit 310 measures the amount per unit time of data addressed to each mobile station device, which is received by the communication unit 304, and the amount per unit time of data transmitted from the transceiver unit 301 to the mobile station device. The communication traffic measuring unit 310 compares the results of those measurements, and requests the mobile station device for which the amount of data received by the communication unit 304 is larger than the amount of data transmitted by the transceiver unit 301, to improve the throughput. In other words, the communication traffic measuring unit 310 instructs the CA request notifying unit 311 to notify the mobile station device of a request for carrier aggregation.

Additionally, the communication traffic measuring unit 310 transmits via the communication unit 304 to the HeNB GW 104, data addressed to other devices, which is received by the transceiver unit 301 from the mobile station device. Here, the condition for the communication traffic measuring unit 310 to request for an improvement of the throughput is not limited to the above condition, but may be other conditions. For example, a condition may be such that the amount per unit time of data addressed to each mobile station, which is received by the communication unit 304, exceeds a threshold value. Alternatively, a condition may be such that the amount per unit time of data transmitted by the mobile station device exceeds a threshold value.

Upon receiving an instruction from the communication traffic measuring unit 310, the CA request notifying unit 311 generates a CA request that requests the mobile station device specified by the instruction, to initiate carrier aggregation, and notifies the mobile station device of the CA request via the transceiver unit 301. The CA request is transmitted as, for example, an RRC (radio resource control) signal.

Upon receiving base station information as a response to the CA request, the CA connection instructing unit 312 transmits via the communication unit 304, a CA connection instruction to the base station device indicated by the base station information (HeNB 102 in this case). In other words, the CA connection instructing unit 312 transmits via the communication unit 304 to the HeNB GW 104, the CA connection instruction and identification information indicating the mobile station device 105 having transmitted the response to the CA request, along with base station information indicating the base station device as the final destination of those information. Additionally, the CA connection instructing unit 312 receives via the communication unit 304, a response to the connection instruction CA.

The CA connection requesting unit 313 receives via the communication unit 304, the CA connection instruction and the identification information indicating the mobile station device. The CA connection instruction and the identification information are information transmitted by another HeNB along with base station information indicating the other HeNB and forwarded by the HeNB GW 104 to the HeNB 101. Here, as will be described later, regarding other communication among other HeNBs, the HeNB GW 104 similarly relays the communication to the transmission destination HeNB specified by the transmission source HeNB. Upon receiving the CA connection instruction and the identification information, the CA connection requesting unit 313 instructs the transceiver unit 301 to establish CA connection to the mobile station device indicated by the identification information. Here, CA connection is call connection to be established as an SCC. When the transceiver unit 301 successfully establishes CA connection, the CA connection requesting unit 313 transmits a CA connection response via the communication unit 304.

Figure 6:
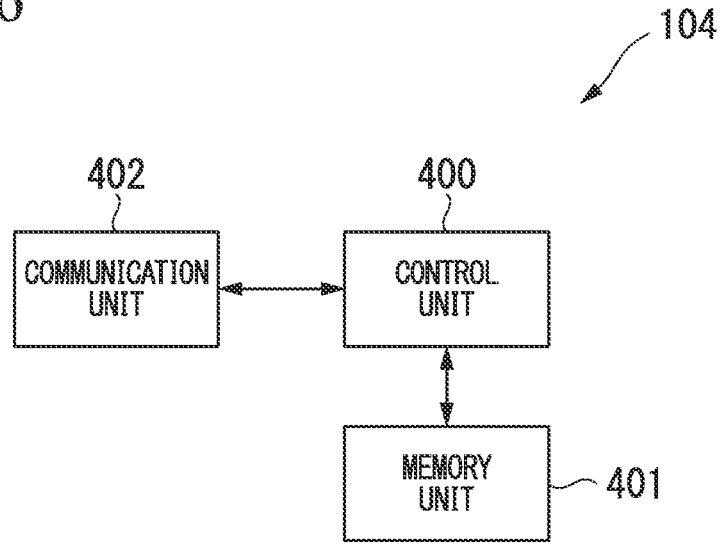
FIG. 6 is a schematic block diagram illustrating a configuration of a HeNB GW according to the first embodiment.

FIG. 6 is a schematic block diagram illustrating a configuration of the HeNB GW 104.

The HeNB GW 104 includes a control unit 400, a memory unit 401, and a communication unit 402.

The control unit 400 reads and executes a program stored by the memory unit 401, thus controlling the entire HeNB GW 104.

The memory unit 401 stores a program to be executed by the control unit 400, and data required for executing the program.

The communication unit 402 communicates with other devices connected via the core network 106 and the HeNBs 101 to 103.

Figure 7:
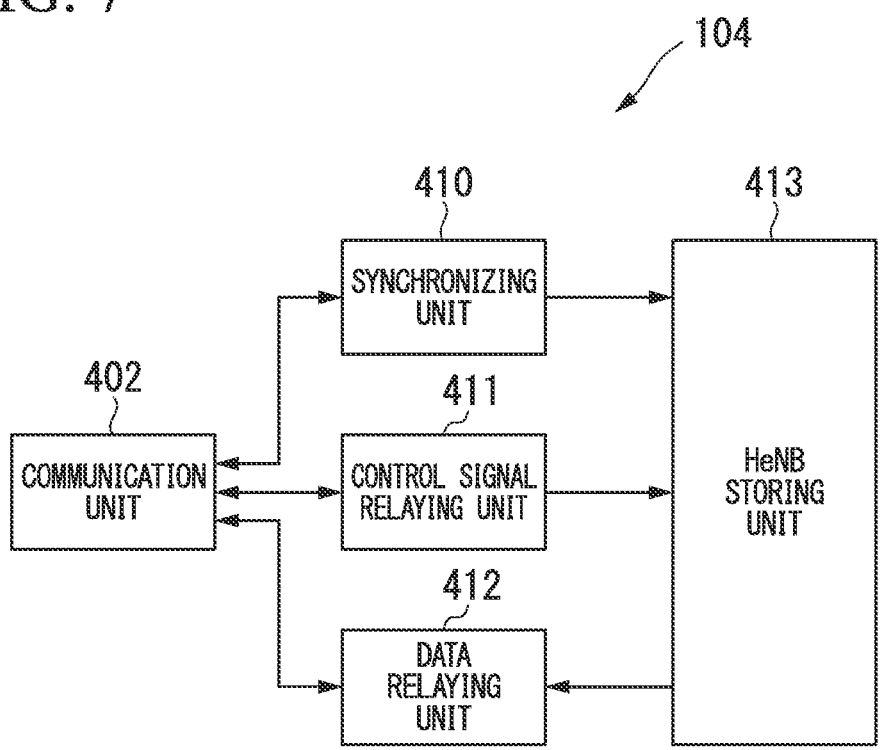
FIG. 7 is a schematic block diagram illustrating a configuration of part of logical functions of the HeNB GW according to the first embodiment.

FIG. 7 is a schematic block diagram illustrating a configuration of part of logical functions of the HeNB GW 104.

In FIG. 7, a synchronizing unit 410, a control signal relaying unit 411, a data relaying unit 412, and a HeNB storing unit 413 are implemented by the control unit 400 reading and executing the program stored by the memory unit 401.

The HeNB storing unit 413 stores identification information of the HeNB that is under the control of the HeNB GW 104, and identification information of the mobile station device being connected to the HeNB while associating those information with each other.

The synchronizing unit 410 communicates via the communication unit 402 with HeNBs (HeNBs 101 to 103 in this case) which are under the control of the HeNB GW 104 and synchronizes the wireless signals to be transmitted by those HeNBs.

The control signal relaying unit 411 transmits via the communication unit 304, the control signal (e.g., a CA connection instruction and a response thereto) transmitted from a HeNB to another HeNB and received by the communication unit 304, to the other HeNB, thus relaying the control signal. Here, each HeNB specifies a transmission destination HeNB and transmits each control signal to the HeNB GW 104. The control signal relaying unit 411 relays the control signal to the specified transmission destination HeNB.

When the communication unit 402 receives the data addressed to the mobile station device which is transmitted from another device connected via the core network 106, the data relaying unit 412 refers to the HeNB storing unit 413 and transmits the data via the communication unit 402 to the HeNB being connected to the mobile station device.

Here, when there are a plurality of HeNBs being connected to the mobile station device, that is, while carrier aggregation is performed, the data relaying unit 412 segments the data. Then, the data relaying unit 412 transmits each of the segmented data to the HeNB determined by, for example, the round-robin method. Additionally, the data relaying unit 412 forwards transmission data transmitted from the mobile station device and received by the communication unit 402, to the destination of the transmission data via the communication unit 402 and the core network 106.

While carrier aggregation is performed, the communication unit 402 receives via a plurality of HeNBs, the transmission data transmitted from the mobile station device 105, but the data relaying unit 412 forwards those data together to the destination of the transmission data.

Figure 8:
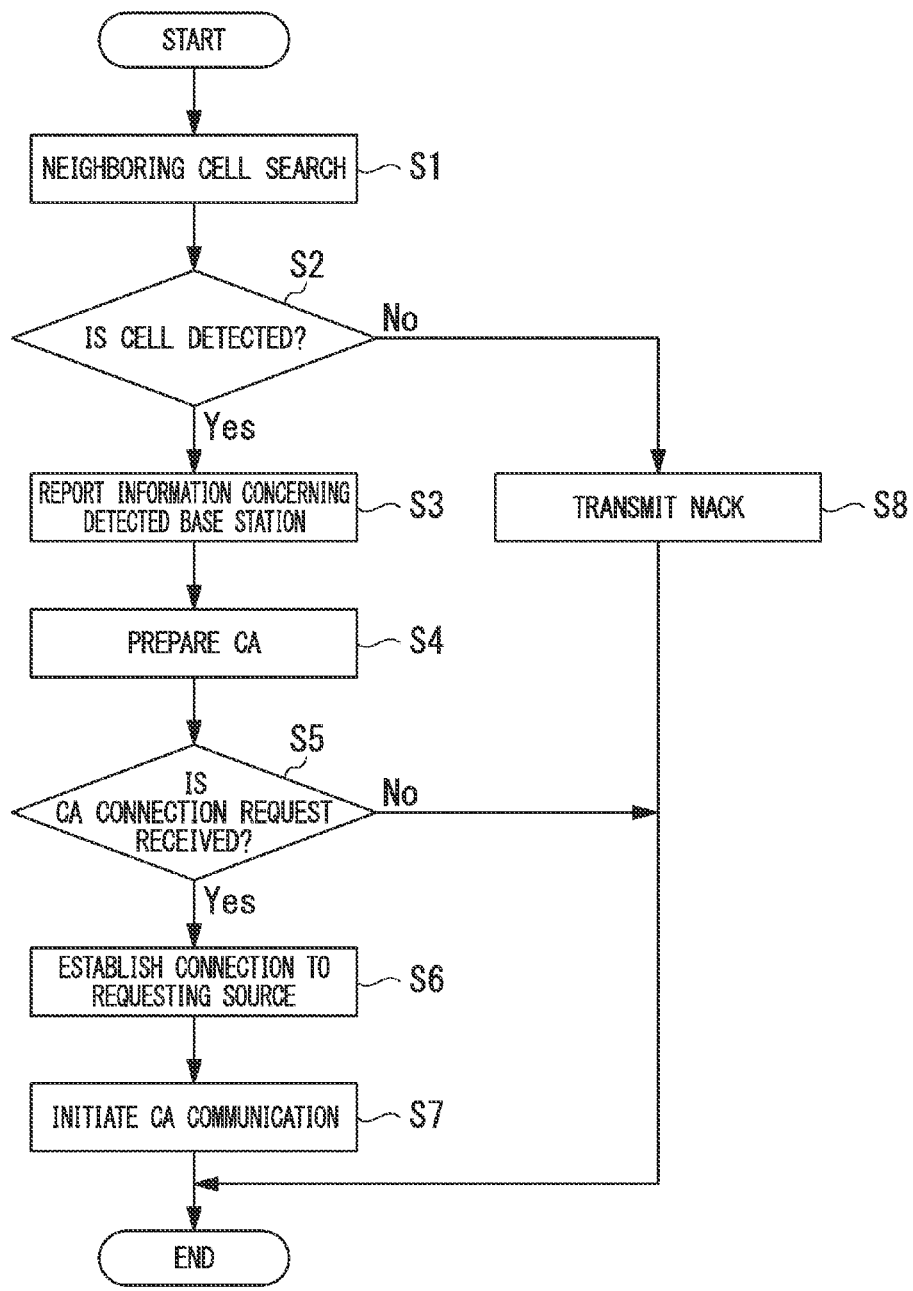
FIG. 8 is a flowchart illustrating operation to be performed when the mobile station device according to the first embodiment receives a CA request.

FIG. 8 is a flowchart illustrating operation to be performed when the mobile station device 105 of the present embodiment receives a request CA.

First, when the transceiver unit 200 receives a CA request from the HeNB 101, the cell search unit 210 performs, by controlling the transceiver unit 201, cell search for neighboring cells (S1). If a cell cannot be detected by the cell search (S2—No), the cell search unit 210 transmits NACK via the reception unit 200 (S8), and then terminates the processing.

If a cell is detected in step S1 (S2—Yes), the base station notifying unit 211 transmits via the transceiver unit 200, base station information concerning the cell detected in step S1 (S3). Additionally, the CA processing unit 212 prepares for carrier aggregation (S4). In other words, the CA processing unit 212 sets the reference frequency of the transceiver unit 201 so that communication is performed using the frequency band for the base station device (HeNB 102 in this case) detected by the cell search unit 210. The CA processing unit 212 waits a predetermined time until the transceiver unit 201 receives a CA connection request. If the predetermined time has elapsed without reception of a CA connection request (S5—No), the processing is terminated without further process. Additionally, if the transceiver unit 201 receives a CA connection request, the CA processing unit 212 establishes, via the transceiver unit 201, connection with the base station device (HeNB 102 in this case) having transmitted the CA connection request (S6). Thus, the CA processing unit 212 initiates CA communication with the transmission source of the CA request (HeNB 101 in this case) and the transmission source of the CA connection request (HeNB 102 in this case) (S7).

Figure 9:
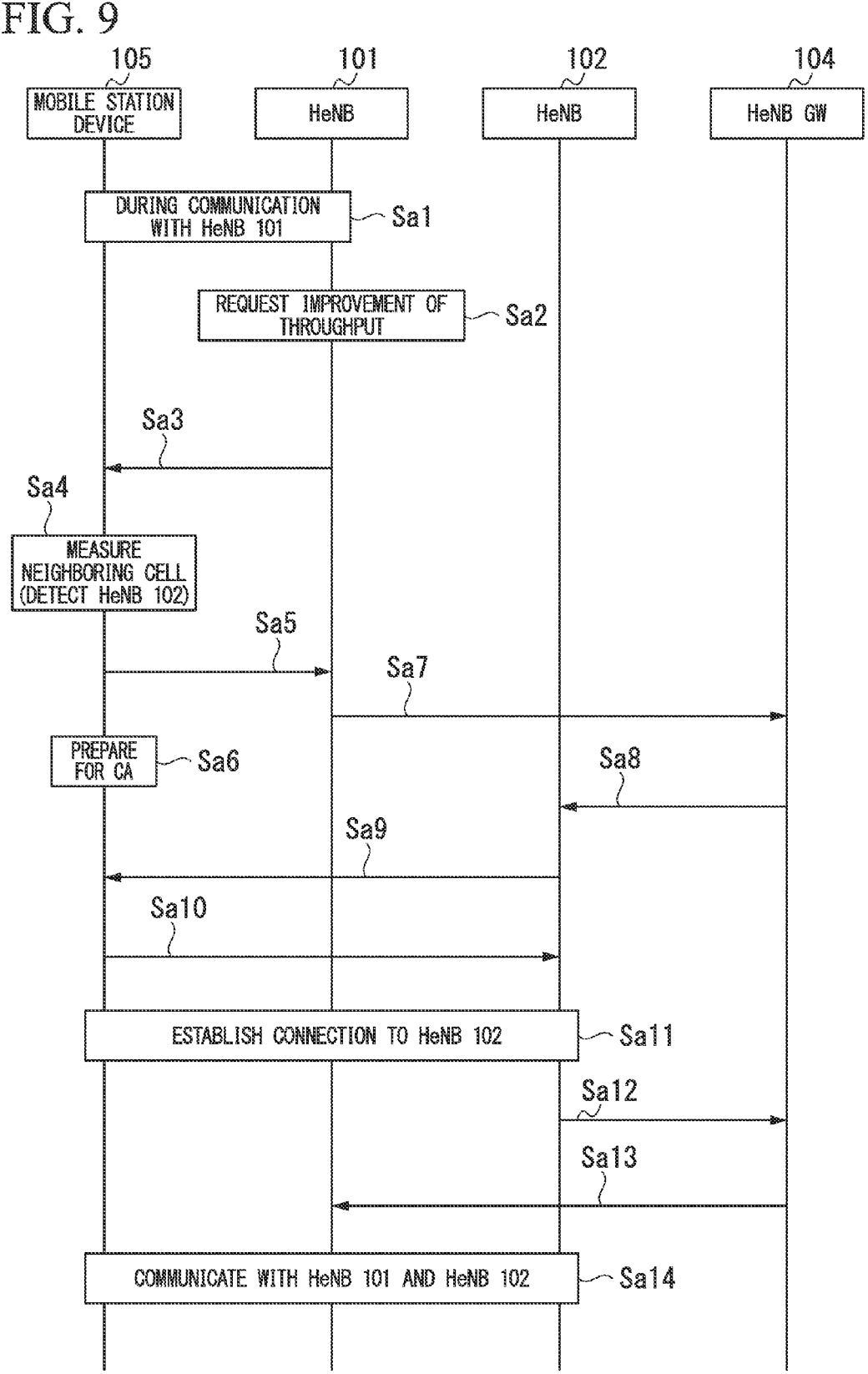
FIG. 9 is a sequence chart illustrating operation of a wireless communication system according to the first embodiment.

FIG. 9 is a sequence chart illustrating operation of the wireless communication system 100 according to the present embodiment.

Here, communication among the HeNB GW 104 and the HeNBs 101 and 102 is performed via the communication units 304 and 402 included in respective devices, but a description thereof is omitted in the following descriptions. Additionally, communication among the mobile station device 105 and the HeNBs 101 and 102 is performed via the transceiver unit 301, the transceiver antenna 300, the transceiver units 200 and 201, and the transceiver antennas 206 and 207, but a description thereof is omitted in the following descriptions.

First, while the mobile station device 105 is communicating with the HeNB 101 (Sa1), the communication traffic measuring unit 310 of the HeNB 101 requests for an improvement of throughput, based on a result of measurement on the communication traffic addressed to the mobile station device 105 (Sa2). Upon receiving the request, the CA request notifying unit 311 of the HeNB 101 transmits a CA request to the mobile station 105 to improve the throughput by carrier aggregation (Sa3).

Upon receiving this CA request, the cell search unit 210 of the mobile station device 105 performs measurement of neighboring cells (cell search) (Sa4). It is assumed here that the cell search unit 210 has detected the HeNB 102 by the cell search. The base station notifying unit 211 transmits to the HeNB 101, as a CA request response, base station information indicating the HeNB 102 detected by the cell search unit 210 (Sa5). The CA processing unit 212 of the mobile station device 105 prepares for carrier aggregation (Sa6). Specifically, the CA processing unit 212 sets the reference frequency of the transceiver unit 201 so that communication is performed using the frequency band for the HeNB 102 detected by the cell search unit 210. Then, the CA processing unit 212 enters a state of waiting for a call connection request for CA connection from the HeNB 102.

On the other hand, when the transceiver unit 301 of the HeNB 101 receives a CA request response in sequence Sa5, the CA connection instructing unit 312 generates a CA connection instruction addressed to the HeNB 102 specified by the CA request response, and transmits to the HeNB GW 104, the generated CA connection instruction along with information indicating the mobile station device 105 as the destination of the CA connection (Sa7). The control signal relaying unit 411 of the HeNB GW 104 transmits the CA connection instruction and the information indicating the mobile station device 105, to HeNB 102 as the destination thereof (Sa8). The CA connection requesting unit 313 of the HeNB 102 receives the CA connection instruction and identification information indicating the mobile station device 105. Upon receiving the CA connection instruction and the identification information, the CA connection requesting unit 313 transmits a CA connection request to the mobile station device 105 indicated by identification information (Sa9).

The CA connection request is a call connection request for CA connection and is for establishing connection as an SCC. The CA processing unit 212 of the mobile station device 105 receives the CA connection request from the HeNB 102. Upon receiving the CA connection request, the CA processing unit 212 returns an ACK (acknowledge) signal to the HeNB 102 using a PUSCH (physical uplink shared channel) signal (Sa10). The ACK signal is similar to the ACK signal transmitted by the mobile station device to transmit a response when data is received by communication.

When communication connection with an SCC is initiated between the mobile station device 105 and the HeNB 102 (Sa11), the CA connection requesting unit 313 of the HeNB 102 notifies the HeNB GW 104 of a response to the CA connection instruction (Sa12). Along with the response to the CA connection instruction, the CA connection requesting unit 313 notifies the HeNB GW 104 of base station information indicating the HeNB 101 having transmitted the CA connection instruction (i.e., the transmission destination of the response). Upon receiving the base station information and the response to the CA connection instruction, the control signal relaying unit 411 of the HeNB GW 104 transmits a response to the CA connection instruction, to the HeNB 101 indicated by the base station information (Sa13). Thereafter, the mobile station device 105 communicates by carrier aggregation with both the HeNBs 101 and 102 (Sa14).

Figure 10:
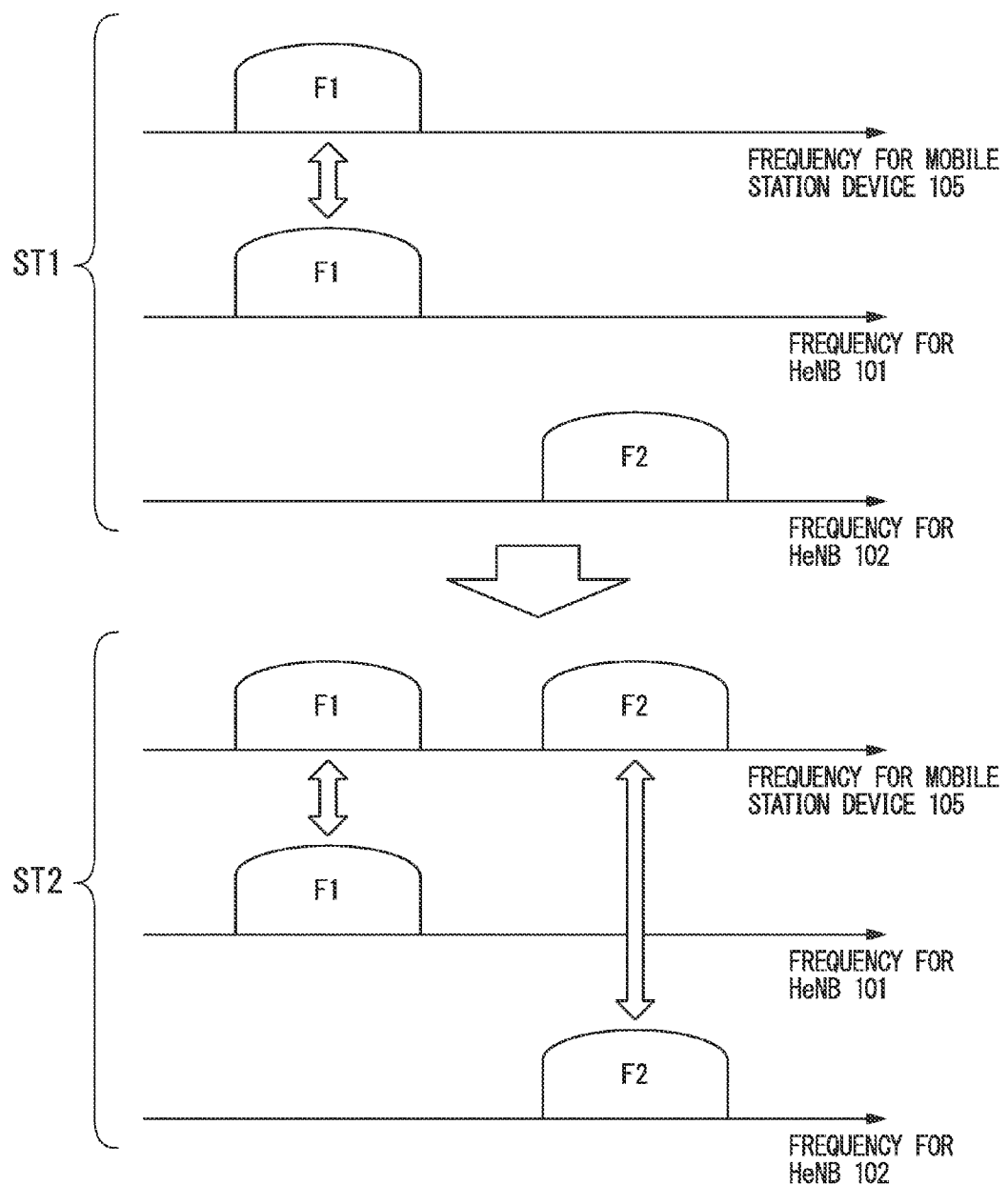
FIG. 10 is a diagram illustrating an example of a change in use state of frequency bands according to the first embodiment.

FIG. 10 is a diagram illustrating an example of a change in use state of frequency bands.

In an example indicated by a reference symbol ST1 which is a case where carrier aggregation is not being performed, the mobile station device 105 and the HeNB 101 communicate with each other using a frequency band F1. The HeNB 102 can use a frequency band F2, but is not communicating with the mobile station device 105. This corresponds to Sa1 shown in FIG. 9. On the other hand, in an example indicated by a reference symbol ST2 which is a case where carrier aggregation is being performed, the mobile station device 105 and the HeNB 101 communicate with each other using the frequency band F1, and the mobile station device 105 and the HeNB 102 communicate with each other using a frequency band F2. This corresponds to Sa14 shown in FIG. 9.

Thus, even if only one component carrier is provided by the HeNB 101, the mobile station device 105 can simultaneously communicate with the HeNB 101 and other base station devices (HeNB 102 in this case), thereby making it possible to achieve an excellent transmission rate.

Second Embodiment

Hereinafter, a second embodiment of the present invention will be described with reference to the drawings.

Similar to the wireless communication system 100 shown in FIG. 1, a wireless communication system 100*b* of the present embodiment includes HeNBs 101*b*, 102*b*, and 103*b*, the HeNB GW 104, and a mobile station device 105*b*. The HeNB GW 104 has a similar configuration to that of the HeNB GW 104 shown in FIG. 1, and therefore a description thereof is omitted here. The HeNBs 101*b*, 102*b*, and 103*b* have similar configurations to that of the HeNB 101 shown in FIG. 1, but configurations of logical functions are different in part, and therefore will be described later. Additionally, the mobile station device 105*b* has a similar configuration to that of the mobile station device 105 shown in FIG. 1, but a configuration of logical functions is different in part, and therefore will be described later.

Figure 11:
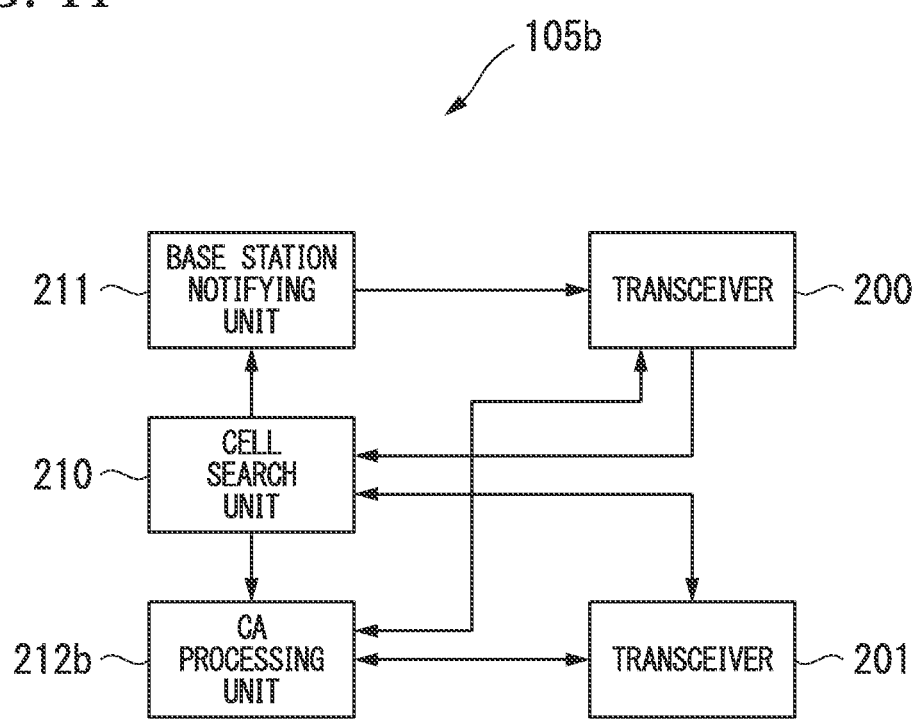
FIG. 11 is a schematic block diagram illustrating a configuration of part of logical functions of a mobile station device according to a second embodiment of the present invention.

FIG. 11 is a schematic block diagram illustrating a configuration of part of logical functions of the mobile station device 105*b*.

In FIG. 11, the cell search unit 210, the base station notifying unit 211, a CA processing unit 212*b*, and the control unit 203 are implemented by reading and executing a program stored by the memory unit 204. Additionally, in FIG. 11, the same reference numerals (200, 201, 210, and 211) are appended to units corresponding to those shown in FIG. 3, and a description thereof is omitted here. Here, in the following descriptions, communication with the HeNB 101*b* is performed via the transceiver unit 200, and communication with the HeNB 102*b* is performed via the transceiver unit 201.

Upon receiving a CA connection request from the base station device (HeNB 101*b*), the CA processing unit 212*b* performs a process of preparing for CA. Specifically, the CA processing unit 212*b* sets a reference frequency of the transceiver unit 201 so that communication is performed using the frequency band for the base station device (HeNB 102*b*) detected by the cell search unit 210. Then, the CA processing unit 212*b* transmits a data communication initiation request to the HeNB 102*b*, using a PUSCH signal. Here, the HeNB 102*b*, which is the destination of the data communication initiation request, may be determined based on a result of the cell search performed by the cell search unit 210, or be specified by the HeNB 101*b* using a CA connection request. Here, the data communication initiation request is a message to be transmitted at the start of data communication, and indicates the beginning of user data, that is, a call connection request (call request). Then, the CA processing unit 212*b* performs a connection process with the HeNB 102*b*. Upon completing the connection process, the CA processing unit 212*b* transmits to the HeNB 101*b*, a CA initiation response as a response to the CA connection request.

Figure 12:
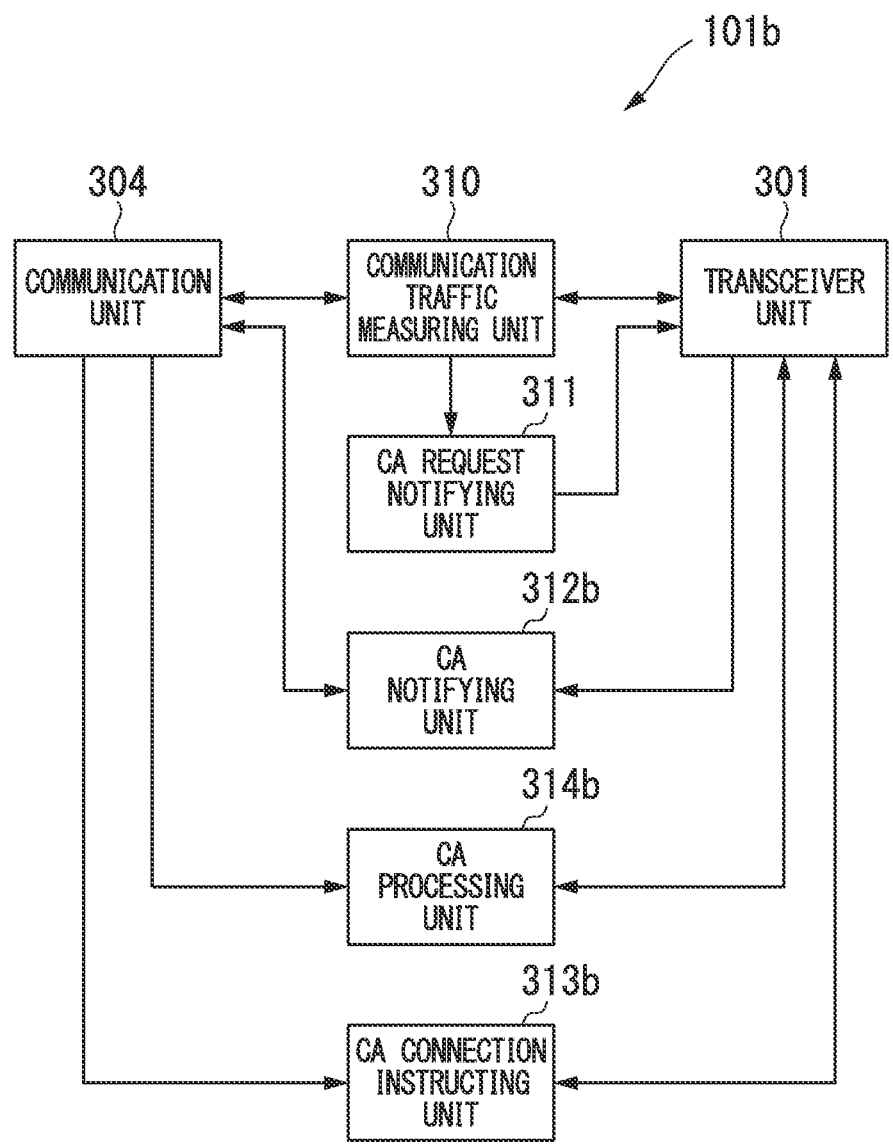
FIG. 12 is a schematic block diagram illustrating a configuration of part of logical functions of a HeNB according to the second embodiment.

FIG. 12 is a schematic block diagram illustrating a configuration of part of logical functions of the HeNB 101*b*.

The HeNB 102*b* has a similar configuration to that of the HeNB 101*b*, and therefore a description thereof is omitted here. In FIG. 12, the communication traffic measuring unit 310, the CA request notifying unit 311, a CA notifying unit 312*b*, a CA connection requesting unit 313*b*, and a CA processing unit 314*b* are implemented by the control unit 302 reading and executing a program stored by the memory unit 303. Additionally, in FIG. 12, the same reference numerals (301, 304, 310, and 311) are appended to units corresponding to those shown in FIG. 5, and a description thereof is omitted here. Here, in the following descriptions, communication with another HeNB is performed via the communication unit 304 and the HeNB GW 104. Additionally, communication with the HeNB GW 104 is performed via the communication unit 304, and communication with the mobile station device 105*b* is performed via the transceiver unit 301.

Upon receiving base station information that is a response to the CA request from the mobile station 105*b*, the CA notifying unit 312*b* transmits a CA notification to the base station device indicated by the base station information (HeNB 102*b* in this case). In other words, the CA notifying unit 312*b* transmits the CA notification and identification information indicating the mobile station device having requested the CA, along with base station information indicating the base station device that is the transmission destination of those information. Additionally, the CA notifying unit 312*b* receives a response to the CA notification.

Upon receiving the CA notification issued by the other HeNB and the identification information indicating the mobile station device, the CA processing unit 314*b* prepares for carrier aggregation to establish connection as an SCC with the mobile station device indicated by the identification information. In other words, the HeNB 102*b* enters a standby state for receiving the above-described data communication initiation request. When preparation for carrier aggregation is complete, the CA processing unit 314*b* transmits via the communication unit 304, CA_ACK that is a response to the CA notification. Here, if a data communication initiation request is received from the mobile station device 105*b* during this standby state, the CA processing unit 314*b* performs a connection process with the mobile station device 105*b*.

For example, when the HeNB 101*b* is being connected as a PCC to the mobile station device 105*b*, and the HeNB 102*b* is to establish connection as an SCC to the mobile station device 105*b*, the CA processing unit 314*b* included in the HeNB 102*b* performs the above operation. In other words, the CA processing unit 314*b* of the HeNB 102*b* receives the CA notification issued by the HeNB 101*b* and the identification information indicating the mobile station device 105*b*, and prepares for carrier aggregation. Then, the CA processing portion 314*b* of the HeNB 102*b* transmits to the HeNB 101*b* via the communication unit 304, CA_ACK that is a response to the CA notification.

When the CA notifying unit 312*b* receives a response to the CA notification, the CA connection requesting unit 313*b* transmits a CA connection request to the mobile station device that has requested the CA. Additionally, upon receiving from the mobile station device, a CA initiation response that is a response to the CA connection, the CA connection requesting unit 313b notifies the HeNB GW 104 of initiation of carrier aggregation.

Figure 13:
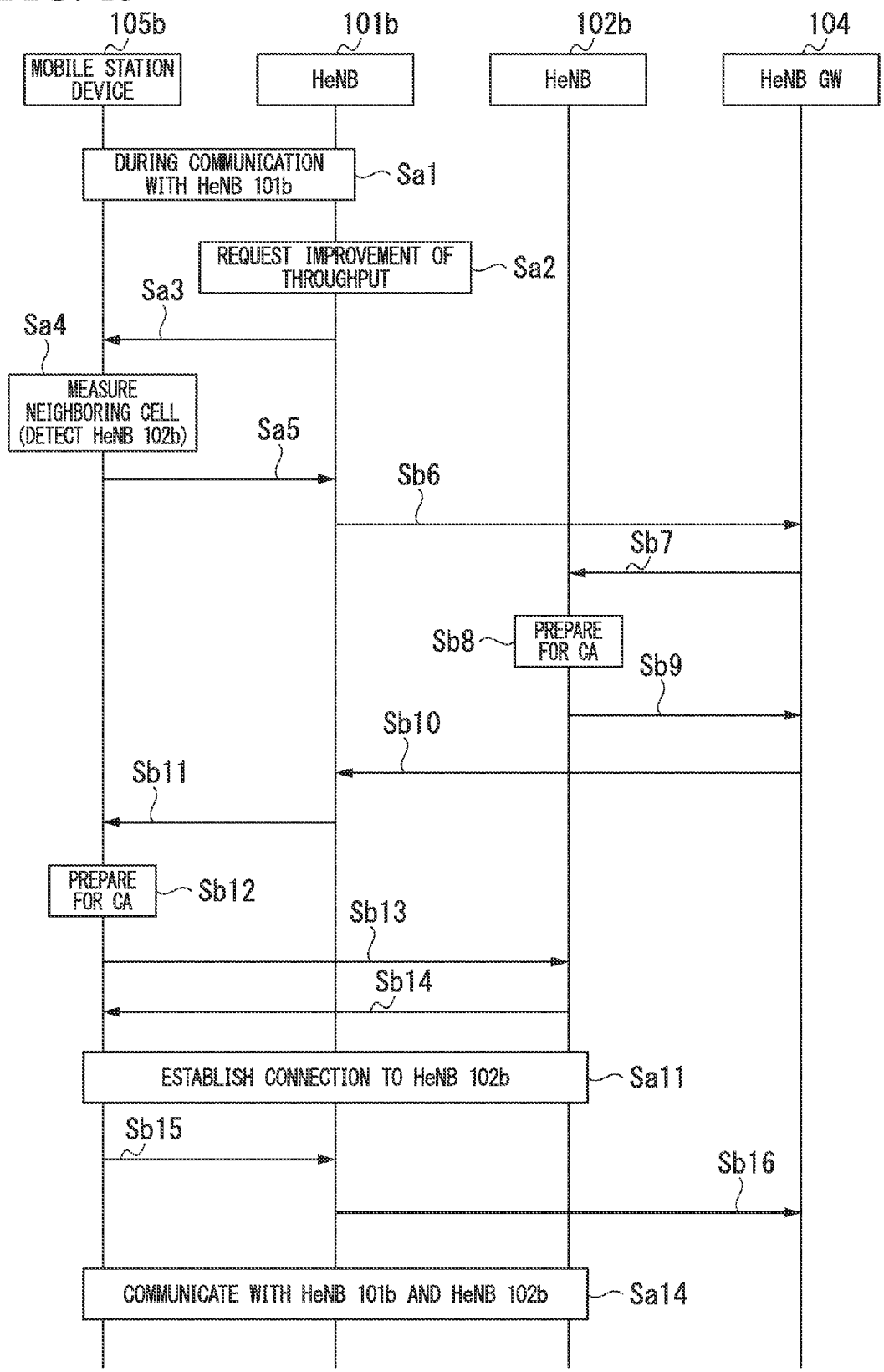
FIG. 13 is a sequence chart illustrating operation of a wireless communication system according to the second embodiment.

FIG. 13 is a sequence diagram illustrating operation of the wireless communication system 100b according to the present embodiment.

In FIG. 13, the same reference symbols (Sa1 to Sa5, and Sa11 to Sa14) are appended to steps corresponding to those in FIG. 9, and a description thereof is omitted here.

Upon receiving base station information that is a CA request response, the CA notifying unit 312b transmits a CA notification to the HeNB 102b indicated by the base station information, along with the identification information indicating the mobile station device 105b and the base station information indicating the HeNB 102b (Sb6). Upon receiving those information along with the CA notification, the control signal relaying unit 411 of the HeNB GW 104 forwards those information to the HeNB 102b (Sb7).

Upon receiving the CA notification and the identification information indicating the mobile station device 105b, the CA processing unit 314b of the HeNB 102b prepares for carrier aggregation to establish connection as an SCC with the mobile station device 105b indicated by the identification information (Sb8). When the preparation is completed, the CA processing unit 314b notifies the HeNB GW 104 of a response (CA_ACK) to the CA notification and base station information indicating the HeNB 101b that is the transmission destination of the response (Sb9), similarly to the sequence Sa12 shown in FIG. 9. Upon receiving the response to the CA notification and the base station information, the control signal relaying unit 411 of the HeNB GW 104 forwards those information to the HeNB 101b (Sb10).

When the CA notifying unit 312b of the HeNB 101b receives the response to the CA notification, the CA connection requesting unit 313b transmits a CA connection request to the mobile station device 105b (Sb11). Upon receiving the CA connection request, the CA processing unit 212b of the mobile station device 105b performs a process of preparing for CA (Sb12). Then, the CA processing unit 212b transmits a data communication initiation request to the HeNB 102b (Sb13). Upon receiving the data communication initiation request, the CA processing portion 314b of the HeNB 102b transmits ACK as a response to the mobile station device 105b (Sb14). When the communication connection with an SCC is initiated between the mobile station device 105b and the HeNB 102b (Sa11), the CA processing unit 212b transmits a CA initiation response to the HeNB 102b (Sb15).

Upon receiving this CA initiation response, the CA connection requesting unit 313b notifies the HeNB GW 104 of the CA initiation (Sb16). Upon receiving the CA initiation, the data relaying unit 412 of the HeNB GW 104 allocates and transmits to the HeNB 101b and the HeNB 102b, data addressed to the mobile station device 105b. Thereafter, the mobile station device 105b communicates by the carrier aggregation with both the HeNB 101b and 102b (Sa14).

Thus, even if only one component carrier is provided by the HeNB 101b provided, similarly to the first embodiment, the mobile station device 105b can simultaneously communicate with the HeNB 101b and other base station devices (HeNB 102b in this case), thereby making it possible to achieve an excellent transmission rate.

Third Embodiment

Hereinafter, a third embodiment of the present invention will be described with reference to the drawings.

Similar to the wireless communication system 100 shown in FIG. 1, a wireless communication system 100c according to the present embodiment includes HeNBs 101c, 102c, and 103c, a HeNB GW 104c, and a mobile station device 105c.

The mobile station device 105c has a similar configuration to that of the mobile station device 105 shown in FIG. 1, but a configuration of logical functions is different in part, and therefore will be described later. Additionally, the HeNBs 101c, 102c, and 103c have similar configurations to that of the HeNB 101 shown in FIG. 1, but a configuration of logical functions is different in part, and therefore will be described later. Further, the HeNB GW 104c has a similar configuration to that of the HeNB GW 104 shown in FIG. 1, but a configuration of logical functions is different in part, and therefore will be described later.

Figure 14:
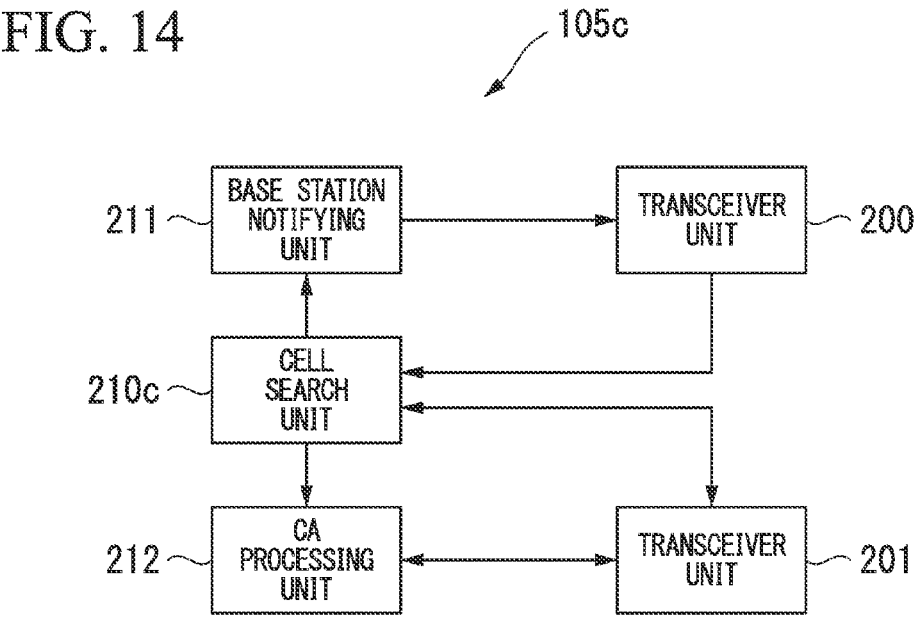
FIG. 14 is a schematic block diagram illustrating a configuration of part of logical functions of a mobile station device according to a third embodiment of the present invention.

FIG. 14 is a schematic block diagram showing a configuration of part of logical functions of the mobile station device 105c.

In FIG. 14, a cell search unit 210c, the base station notifying unit 211, and the CA processing unit 212 are implemented by the control unit 203 reading and executing a program stored by the memory unit 204. Additionally, in FIG. 14, the same reference numerals (200, 201, 211, and 212) are appended to units corresponding to those shown in FIG. 3, and a description thereof is omitted here. When the transceiver unit 200 receives a carrier aggregation request (CA request) from the HeNB 101c, the cell search unit 210c performs a search for neighboring cells (cell search) using the transceiver unit 201, and thus searches base station devices available for carrier aggregation. At this time, the cell search unit 210c performs a cell search while regarding as the target, the base station device specified by base station information included in the CA request. The cell search unit 210c selects one base station device suitable for carrier aggregation from the base station devices detected by the cell search. The cell search unit 210c returns to the HeNB 101c, a CA request response including base station information indicating the selected base station device.

Here, when a base station device suitable for performing carrier aggregation is selected, the cell search unit 210c uses the reception power of signals received from the respective base station devices, the congestion level of each base station device, utilization, a type of use (such as open, CSG (closed subscriber group), or hybrid), and the like. For example, in the case of using the congestion level, the cell search unit 210c receives broadcast information from the detected base station (such as the HeNB 102c), and determines whether or not the base station device is in the congestion state, based on information included in the broadcast information. If the base station device is in the congested state, the cell search unit 210c determines that the base station device is ineligible. If the base station device is not in the congested state, the cell search unit 210c determines that the base station device is eligible.

In the case of using utilization, the cell search unit 210c makes the determination based on the magnitude of the number of resource blocks allocated by the detected base station device (resource blocks available to the mobile station device 105c). If the number of allocated resource blocks is greater than a predetermined threshold value, the cell search unit 210c determines that the base station device is eligible. If the number of allocated resource blocks is less than the threshold value, the cell search unit 210c determines that the base station device is ineligible. Additionally, in the case of using the type of use, the cell search unit 210c receives broadcast information from the detected base station device, refers to CSG_ID included in the broadcast information, and thus determines whether or not the detected base station device is a CSG cell and whether or not the CSG cell is available to the mobile station device 105c. If these conditions are met, the cell search unit 210c preferentially selects that base station device. Additionally, if it is determined as a result of the reference to CSG_ID that the cell is not the CSG cell available to the mobile station device 105c, that is, that the cell is an open-cell, the cell search unit 210c determines that the base station device is ineligible.

Here, the cell search unit 210c may obtain from the broadcast information transmitted by the HeNB 101c, parameters such as a reference frequency to be used for performing cell search.

Additionally, when the HeNB 101c transmits a CA request, parameters such as the required minimum reception power, the number of resource blocks, and the required throughput may be previously included in the CA request so that the cell search unit 210c can obtain from the received CA request, a parameter used as a reference for cell search.

Figure 15:
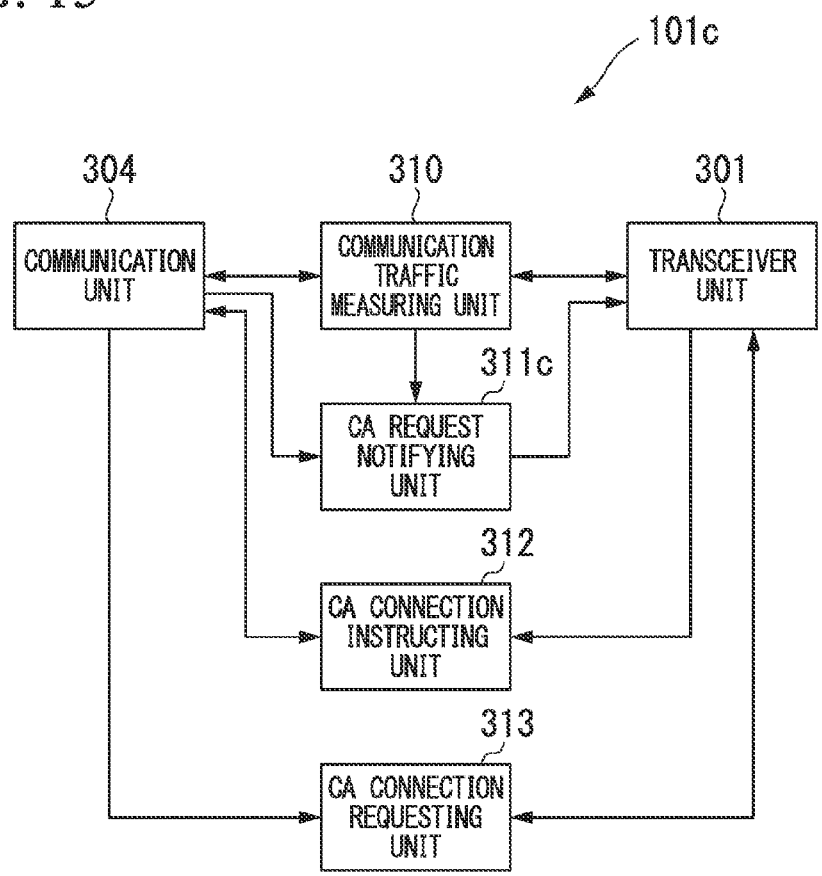
FIG. 15 is a schematic block diagram illustrating a configuration of part of logical functions of a HeNB according to the third embodiment.

FIG. 15 is a schematic block diagram illustrating a configuration of part of logical functions of the HeNB 101c.

In FIG. 15, the communication traffic measuring unit 310, a CA request notifying unit 311c, the CA connection instructing unit 312, and the CA connection requesting unit 313 are implemented by the control unit 302 reading and executing a program stored in the memory unit 303. Further, in FIG. 15, the same reference numerals (301, 304, 310, 312, and 313) are appended to units corresponding to those shown in FIG. 5, and a description thereof is omitted here. Upon receiving an instruction from the communication traffic measuring unit 310, the CA request notifying unit 311c requests the HeNB GW 104c for base station information concerning base station devices available for carrier aggregation. The CA request notifying unit 311c generates a CA request including the base station information obtained in response to the above request, and transmits the generated CA request to the mobile station device 105c.

Figure 16:
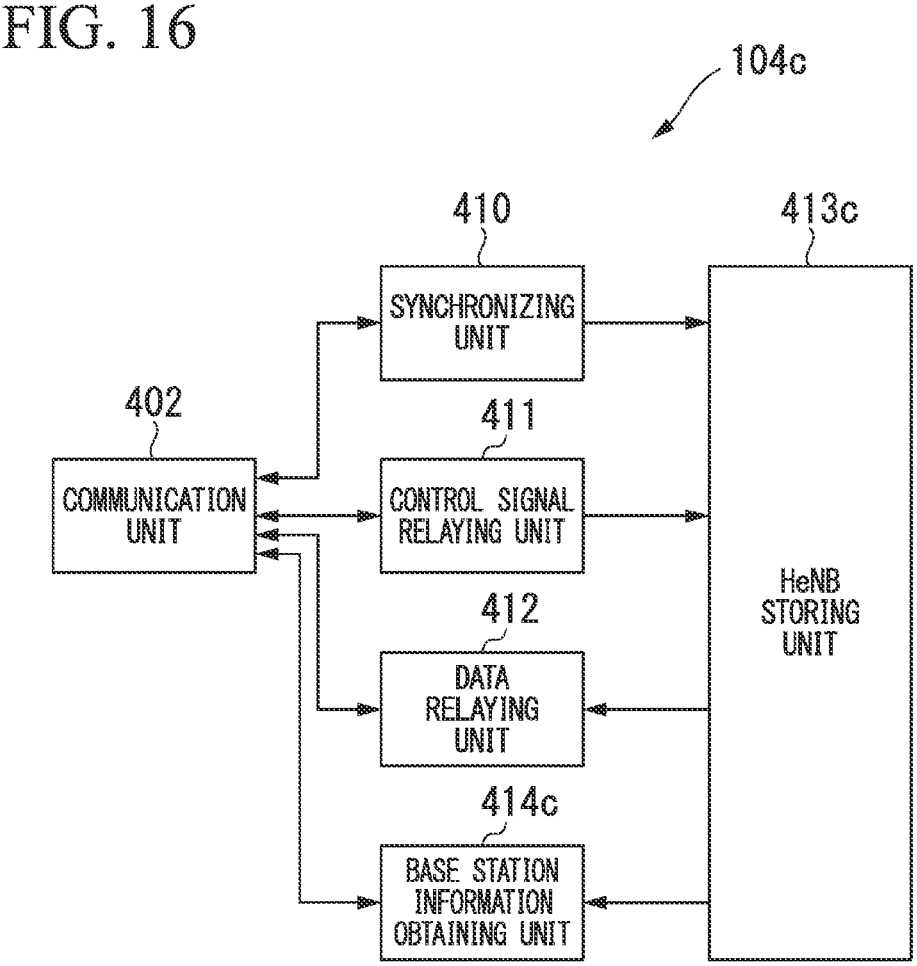
FIG. 16 is a schematic block diagram illustrating a configuration of part of logical functions of a HeNB GW according to the third embodiment.

FIG. 16 is a schematic block diagram illustrating a configuration of part of logical functions of the HeNB GW 104c.

In FIG. 16, the synchronizing unit 410, the control signal relaying unit 411, the data relaying unit 412, a HeNB storing unit 413c, and a base station information obtaining unit 414c are implemented by the control unit 400 reading and executing a program stored in the memory unit 401. Additionally, in FIG. 16, the same reference numerals (402, 410, 411, and 412) are appended to units corresponding to those shown in FIG. 7, and a description thereof is omitted here.

Similar to the HeNB storing unit 413e, the HeNB storing unit 413c stores base station information indicating a HeNB that is under the control of the HeNB GW 104, and identification information of the mobile station device being connected to the HeNB, while associating those information to each other. Further, the HeNB storing unit 413c stores the base station information indicating the HeNB that is under the control of the HeNB GW 104, and base station information indicating a HeNB that can perform carrier aggregation in combination with the above HeNB, while associating those information to each other.

Upon receiving from the HeNB, the request for the base station information indicating base station devices available for carrier aggregation, the base station information obtaining unit 414c reads the identification information of the HeNB which is stored by the HeNB storing unit 413c in association with the identification information of the HeNB, and transmits the read identification information in response to the request.

FIG. 17 is a sequence chart illustrating operation of the wireless communication system 100c according to the present embodiment.

In FIG. 17, the same reference symbols (Sa1, Sa2, and Sa5 to Sa14) are appended to portions corresponding to those shown in FIG. 9, and a description thereof is omitted here.

Upon receiving an instruction from the communication traffic measuring unit 310, the CA request notifying unit 311c requests the HeNB GW 104c for base station information concerning base station devices available for carrier aggregation (Sc2-1). Upon receiving this request, the base station information obtaining unit 414c of the HeNB GW 104c refers to the HeNB storing unit 413c and thereby transmits, as a response, base station information indicating HeNBs that can perform carrier aggregation in combination with the requesting source HeNB (Sc2-2).

The CA request notifying unit 311c of the HeNB 101c CA generates a CA request including the base station information received as the response, and transmits the generated CA request to the mobile station device 105c (Sc3). The cell search unit 210c of the mobile station device 105c obtains the base station information from the CA request, and performs cell search (measurement of neighboring cells) while regarding as targets for the search, the base station devices indicated by the base station information (Sc4). Based on a result of the cell search, the cell search unit 210c selects one base station device suitable for performing the carrier aggregation. Then, the base station notifying unit 211 transmits as a CA request response, base station information indicating the selected base station device (Sa5).

Thus, even if only one component carrier is provided by the HeNB 101c, similarly to the first and second embodiments, the mobile station device 105c can simultaneously communicate with the HeNB 101c and other base station devices (HeNB102c in this case), thereby making it possible to achieve an excellent transmission rate.

Also in the second embodiment, similar to the present embodiment, the cell search unit 210 of the mobile station device 105b may perform cell search while regarding the base station devices indicated by the base station information received from the HeNB GW 104 by the CA request notifying unit 311b of the HeNB 101b.

Additionally, although it has been assumed in each embodiment described above that the HeNBs 101 to 101c and the HeNBs 102 to 102c communicate with the mobile station devices 105 to 105c using the respective single frequency bands (also referred to as component carriers), different frequency bands may be used for uplink and downlink.

Further, the frequency bands used by the HeNBs 101 to 101c may differ in frequency from the frequency bands used by the HeNBs 102 to 102c, such as the 2 GHz band and the 800 MHz band. Alternatively, a frequency band adjacent to the frequency band of the same frequency (for example, 2 GHz band) may be used. Alternatively, a frequency band, which is of the same frequency, but whose frequencies are dispersed in the frequency domain, may be used.

Here, when the HeNBs 101 to 101c use the same frequency band of the frequency as used by the HeNBs 102 to 102c (e.g., the 2 GHz band), the mobile station devices 105 to 105c may use only one transceiver unit to communicate with the HeNBs 101 to 101c and the HeNBs 102 to 102c.

Moreover, a program for implementing part or whole of the functions of the mobile station devices, the HeNBs, and the HeNB GWs of each embodiment may be recorded on a computer-readable recording medium, so that a computer system can read and execute the program recorded on the recording medium to implement the respective units. Here, the "computer system" includes an OS and hardware such as peripheral devices.

Additionally, the "computer-readable recording medium" means a storage device, such as: a portable medium, for example, a flexible disk, a magneto optical disk, a ROM, or a CD-ROM; or a hard disk built in a computer system. Further, the "computer-readable recording medium" may also include a medium that dynamically stores a program for a short period, such as a communication line in a case where the program is transmitted via a network such as the Internet, or a communication line such as a telephone line. Moreover, the "computer-readable recording medium" may also include a medium that temporarily stores a program, such as a volatile memory included in a computer system which serves as a server or client in the above case. Additionally, the above program may be a program for implementing part of the above-described functions. Further, the above program may be a program that can implement the above-described functions in combination with the program already stored in the computer system.

Additionally, part or whole of the mobile station devices 105 to 105c, the HeNBs 101 to 101c, the HeNB s102 to 102c, and the HeNB GWs 104 and 104 of each embodiment described above may be implemented typically as an LSI that is an integrated circuit. Each functional block of the mobile station devices 105 to 105c, the HeNBs 101 to 101c, the HeNBs 102 to 102c, and the HeNB GWs 104 and 104 may be individually made into a chip. Alternatively, part or whole of the functional blocks may be integrated and made into a chip. Additionally, the method of forming an integrated circuit is not limited to LSI, and an integrated circuit may be implemented by a dedicated circuit or a general-purpose processor. Further, if technology of forming an integrated circuit, which replaces LSI, arises as a result of advances in semiconductor technology, an integrated circuit formed by that technology may be used.

As described above, each embodiment of the present invention has been described in detail with reference to the drawings. However, the specific configuration is not limited to those embodiments, and other modifications without departing from the scope of the invention are also included. Additionally, the configuration of each embodiment and combinations thereof are one example, and additions, omissions, substitutions, and other modifications of configurations may be made without departing from the scope of the present invention.

INDUSTRIAL APPLICABILITY

Even if only one component carrier is provided by the HeNB 101, the mobile station device 105 can simultaneously communicate with the HeNB 101 and other base station devices (HeNB 102 in this case), thereby making it possible to achieve an excellent transmission rate.

Additionally, even if only one component carrier is provided by the HeNB 101b, similarly to the first embodiment, similarly to the first embodiment, the mobile station device 105b can simultaneously communicate with the HeNB 101b and other base station devices (HeNB 102b in this case), thereby making it possible to achieve an excellent transmission rate.

Further, even if only one component carrier is provided by the HeNB 101c, similarly to the first and second embodiments, the mobile station device 105c can simultaneously communicate with the HeNB 101c and other base station devices (HeNB 102c in this case), thereby making it possible to achieve an excellent transmission rate.

DESCRIPTION OF REFERENCE NUMERALS 100 to 100c: wireless communication system
101 to 101c, 102 to 102c, 103 to 103c: HeNB
104,104c: HeNB GW
105 to 105c: mobile station device
106: core network
200, 201: transceiver unit
203: control unit
204: memory unit
205: user interface
206, 207: transceiver antenna
210, 210c: cell search unit
211: base station notifying unit
212, 212b: CA processing unit
300: transceiver antenna
301: transceiver unit
302: control unit
303: memory unit
304: communication unit
310: communication traffic measuring unit
311, 311c: CA request notifying unit
312: CA connection instructing unit
312b: CA notifying unit
313, 313b: CA connection requesting unit
314b: CA processing unit
400: control unit
401: memory unit
402: communication unit
410: synchronizing unit
411: control signal relaying unit
412: data relaying unit
413, 413c: HeNB storing unit
414c: base station information obtaining unit

The invention claimed is:

1. A wireless communication system comprising:
a first base station device;
a second base station device; and
a mobile station device configured to communicate with the first and second base station devices, wherein
the first base station device comprises:
a request notifying unit configured to notify the mobile station device of a first information along with a request for carrier aggregation, the first information specifying a base station device targeted for a cell search by the mobile station, the mobile station device comprises:
a cell search unit configured to, upon receiving the request, perform, in accordance with the first information notified by the request notifying unit, the cell search to search the second base station device available for the carrier aggregation; and
a base station notifying unit configured to notify the first base station device of a second information, the second information indicating the second base station device detected by the cell search unit by performing the cell search.

2. The wireless communication system according to claim 1, wherein the first base station device further comprises:
a carrier aggregation connection instructing unit configured to instruct the second base station device indicated by the second information notified by the base station notifying unit, to establish connection with the mobile station device targeted for the carrier aggregation, and the second base station device comprises:
a carrier aggregation connection requesting unit configured to, based on the instruction to establish the connection with the mobile station device, notify the mobile station device of a connection request for performing the carrier aggregation.

3. The wireless communication system according to claim 1, wherein the first base station device further comprises:
a carrier aggregation notifying unit configured to notify the second base station device indicated by the second information notified by the base station notifying unit, of the carrier aggregation with the mobile station device; and
a carrier aggregation connection requesting unit configured to notify the mobile station device of a connection request for performing the carrier aggregation, the connection request being a request for establishing connection with the second base station device indicated by the second information notified by the base station notifying unit.

4. The wireless communication system according to claim 3, wherein the second base station device comprises:
a carrier aggregation processing unit configured to, upon receiving a notification from the carrier aggregation notifying unit, prepare for the carrier aggregation, and in a case that the preparation is complete, notify the first base station device of a response to the notification,
wherein the carrier aggregation connection requesting unit is configured to notify the mobile station device of the connection request after receiving the response from the carrier aggregation processing unit.

5. The wireless communication system according to claim 1, the wireless communication system further comprising a base station gateway,
wherein the base station gateway comprises:
a relaying unit configured to relay communication between the first and second base station devices; and
a base station synchronizing unit configured to synchronize transmission to the mobile station device performed by the first and second base station devices.

6. A wireless communication method for a wireless communication system, the wireless communication system including a first base station device, a second base station device, and a mobile station device, the mobile station device being configured to communicate with the first and second base station devices, the wireless communication method comprising:

notifying, by the first base station device, the mobile station device of a first information along with a request for carrier aggregation, the first information specifying a base station device targeted for a cell search by the mobile station device;
performing, by the mobile station device, upon receiving the request, the cell search to search the second base station device available for the carrier aggregation, the performance being performed in accordance with the notified first information; and
notifying, by the mobile station device, the first base station device of a second information, the second information indicating the second base station device detected by the cell search unit by performing the cell search.

7. A base station device comprising:
a request notifying unit configured to notify a mobile station device of a first information along with a request for carrier aggregation, the first information specifying a base station device targeted for a cell search by the mobile station device, the request being for requesting the mobile station device to perform the cell search based on the request; and
a reception unit configured to receive, from the mobile station device, a second information, the second information indicating another base station device available for the carrier aggregation by the mobile station device, the another base station device having been detected by the cell search performed, by the mobile station device, in accordance with the first information notified by the request notifying unit.

8. A mobile station device comprising:
a cell search unit configured to, upon receiving, from a first base station device, a first information along with a request for carrier aggregation, perform, in accordance with the first information, a cell search to search a second base station device available for the carrier aggregation, the first information specifying a base station device targeted for the cell search by the mobile station device; and
a base station notifying unit configured to notify the first base station device of a second information, the second information indicating the second base station device detected by the cell search unit by performing the cell search.

* * * * *